United States Patent [19]
Wagner

[11] 3,820,564
[45] June 28, 1974

[54] DISPENSING VALVE

[75] Inventor: William Wagner, Miami Beach, Fla.

[73] Assignee: Watsco Inc., Hialeah, Fla.

[22] Filed: Oct. 9, 1973

[21] Appl. No.: 404,500

[52] U.S. Cl............... 137/612.1, 251/215, 251/284
[51] Int. Cl............................................. F16k 31/44
[58] Field of Search ........ 137/612.1; 251/214, 215, 251/218, 219, 128, 291, 284, 330, 264, 274, 275, 276

[56] References Cited
UNITED STATES PATENTS

| | | | |
|---|---|---|---|
| 927,798 | 7/1909 | Hoff | 251/274 X |
| 2,563,244 | 8/1951 | Holicer | 251/276 X |
| 2,833,512 | 5/1958 | Sanborn | 251/215 X |
| 3,145,733 | 8/1964 | Shaw et al. | 137/612.1 X |
| 3,623,697 | 11/1971 | Austin | 251/297 X |

Primary Examiner—William R. Cline
Assistant Examiner—Ira S. Lazarus
Attorney, Agent, or Firm—Ernest H. Schmidt

[57] ABSTRACT

A disposable plastic dispensing valve having a plastic valve body within one end of which is formed an internally threaded bore adjustably screw-threaded within which is the externally threaded shank portion of a valve stem assembly for axial movement thereof between seated and withdrawn positions with respect to a valve seat. The valve body further comprises an increased-diameter cylindrical chamber outwardly of its internally threaded bore within which the threaded shank portion of the valve stem assembly can freely turn when the valve is opened beyond full open position of the valve to prevent forceful turning withdrawal of the valve stem assembly through the upper end of the valve body. Means is provided for resiliently urging the valve stem into inter-threaded engagement with respect to the internally threaded bore of the valve body member to facilitate subsequent shut-off of the valve.

10 Claims, 2 Drawing Figures

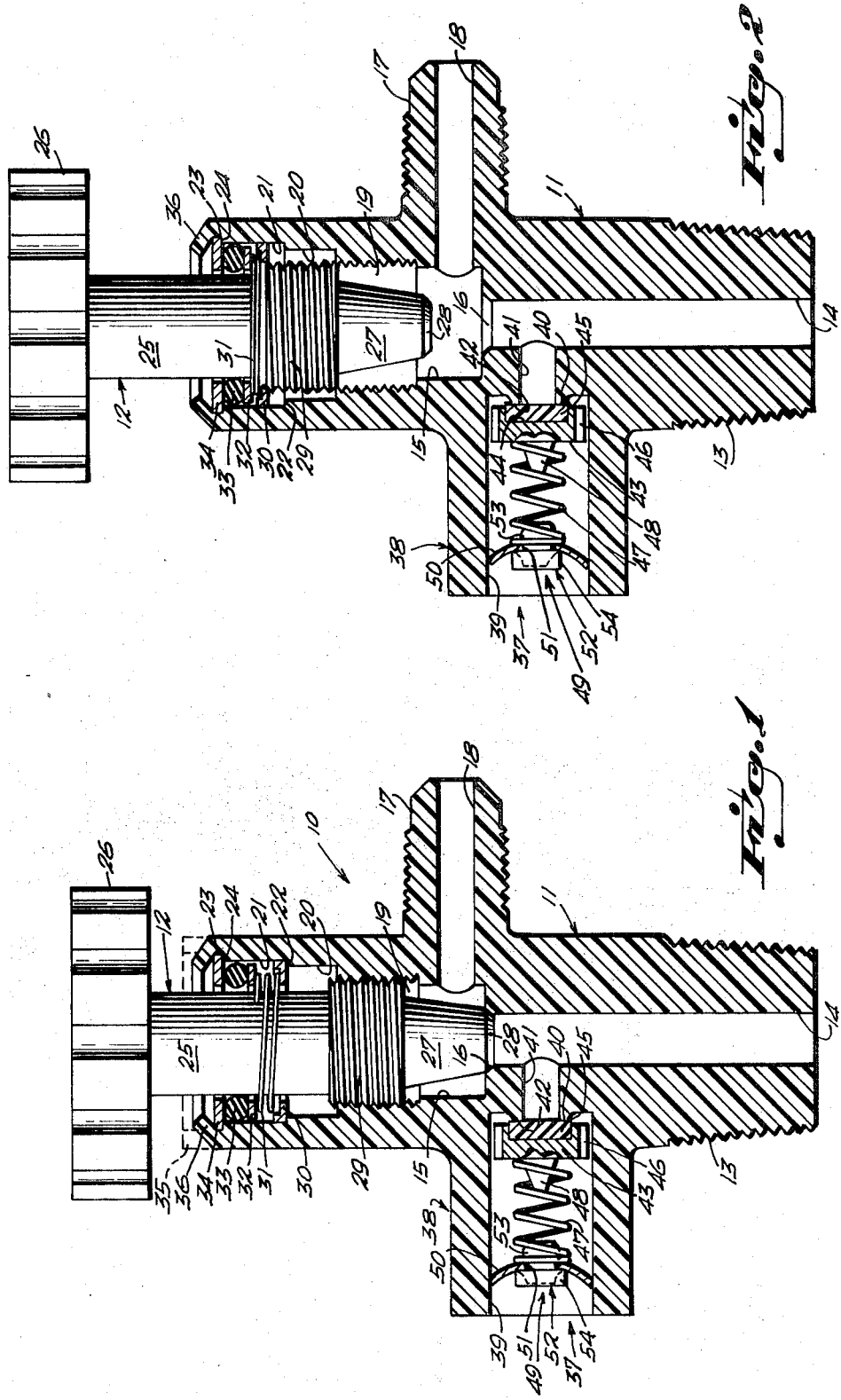

DISPENSING VALVE

This invention relates to dispensing valves and is directed particularly to disposable dispensing valves of the type used to control the flow of liquified gases from pressurized throw-away containers.

Refrigerants are presently sold in 25 and 50 pound throw-away steel containers. In order to keep such container costs to a minimum, they are frequently provided with plastic dispensing valves instead of ordinary dispensing valves fabricated of metal. Such plastic dispensing valves, however, are deficient principally in that, because of the relatively lesser strength of the plastic as compared with metal, when the valve stem is inadvertently turned open beyond the necessary amount to achieve full open flow it may break through the upper part of the plastic valve body. This is a particularly dangerous situation when it is considered that the gas pressure within the valved container is ordinarily very high and therefore capable of blowing the valve stem assembly out of the valve body with hazardous force when the upper end of the valve body is broken away by overturning in attempts at opening the valve. Moreover, a valve which is fully open and "stuck" or "frozen" in its open position cannot always be observed to be either open or shut. When this occurs, the user may assume that the valve is in shut-off position and, in a forceful attempt to open it, break the valve stem through the upper end of the valve body. Heretofore, to prevent such occurrances, heavy plastic nuts and the like have been assembled to the valve body for extra strength. Such expedients, however, are costly, both in material and labor, and therefore undesirable in a throw-away or dispoable dispensing valve.

It is, accordingly, the principal object of this invention to provide a novel and improved synthetic plastic dispensing valve that obviates the above-described deficiency of disposable plastic dispensing valves heretofore devised.

A more particular object of the invention is to provide a plastic dispensing valve of the above nature wherein the valve stem assembly, when turned in the opening direction, unscrews from a co-operating, internally threaded bore within the valve body until the valve is fully opened, at which point further turning of the valve stem assembly in the opening direction fully disengages the threaded shank portion of the valve stem from the threaded bore, enabling it to turn freely within an increased diameter bore within the upper end of the valve body, thereby eliminating the possibility of forceful withdrawal of the valve stem from the upper end of the valve body.

Another object of the invention is to provide a disposable plastic dispensing valve of the character described including resilient thrust means within the increased diameter bore at the upper end of the valve body, which will be operative, when the valve stem assembly is turned through fully open position, to urge the valve stem in the downward direction within the valve body so that, upon thereafter turning the valve assembly in valve-closing direction, the controlling threads will automatically be fed into co-operative interengagement again for forceful closure of the valve in the usual manner.

Still another object of the invention is to provide a plastic dispensing valve of the above nature and further including a pressure relief valve mechanism adjustably controllable to relieve pressure within the valved container at any preselected high pressure within a wide range of pressures.

Still another object is to provide a synthetic plastic dispensing valve of the character described which can be inexpensively manufactured of a tough, synthetic, thermo-plastic material by the use of simple molding and machining techniques, and which will be compact, attractive in appearance, easy to install and operate, and safe and dependable in operation.

Other objects, features and advantages of the invention will be apparent from the following description when read with reference to the accompanying drawings. In the drawings, wherein like reference numerals denote corresponding parts in each of the two figures of the drawing;

FIG. 1 is a vertical cross-sectional view of a preferred form of plastic body dispensing valve, shown in shut-off position; and FIG. 2 is a vertical cross-sectional view corresponding with that of FIG. 1, but showing the valve in open position.

Referring now in detail to the drawings, reference numeral 10 designates a preferred form of plastic body dispensing valve embodying the invention comprising, generally, a valve body member 11 and a valve stem and handle member 12, both of which may be economically fabricated of a tough, chemical-resistant, synthetic thermoplastic material.

The valve body member 11 is generally cylindrical in shape and formed at one end with an external, tapered pipe thread 13 for connection with the internally threaded port of a container, pipe fitting or the like from which the gas or fluid under pressure is to be dispensed. An axial bore 14 extends inwardly of the threaded end of the valve body member 11, said bore defining an entrance port communicating at its inner end with a co-axial valve seat chamber 15 of increased diameter. As is best illustrated in FIG. 2, the zone of juncture between the inner end of the axial bore 14 and the valve seat chamber 15 is defined by a frusto-conical valve seat 16. Integrally formed with the cylindrical body portion of the valve body member 11 in transverse alignment with the valve seat chamber 15 is an externally threaded cylindrical discharge port 17 having a through axial bore 18 communicating with said valve seat chamber above the valve seat 16. The upper end of the cylindrical valve seat chamber 15 opens into a coaxial, increased-diameter, internally threaded bore 19. The upper end of the internally threaded bore 19, in turn, opens into a comparatively short coaxial bore 20 of still further increased diameter, the upper end of which extends into yet another coaxial bore 21 of still further increased diameter which defines, together with the bore 21 at their juncture, an annular shoulder 22. The outer end of the bore 21 opens into a bore 23 of still further increased diameter defining, at its juncture with the bore 21, an annular shoulder 24.

The valve stem and handle member 12 is integrally formed with a generally cylindrical valve stem 25 having a handle 26 at one end and a convergent, frusto-conical portion 27 at the other end terminating in a short, annular frusto-conical portion 28 defining a peripheral surface complimental with the valve seat 16 in the valve body member 11. As is best illustrated in FIG. 1, a portion of the valve stem 25 just above the frusto-conical portion 26 is formed with a coaxial, externally threaded, slightly-increased diameter portion 29 threadable in the internally threaded bore 19. Normally seated upon the annular shoulder 22 above the valve body member bore 20 is a spring retainer ring 30, which is preferably L-shaped in cross section and upon which is seated, at its lower end, a helical compression spring 31 circumjacent the valve stem 25 between the externally threaded increased diameter portion 29 and the handle 26. Seated upon the upper end of the helical spring 31 circumjacent the valve stem 25 is a flat washer 32 upon which is seated, in turn, a resilient O-ring 33 serving as a seal between the valve stem and valve body. The above-described valve stem assembly is retained in assembled relation with respect to the valve member 11 by means of an annular retainer ring 34 seated upon the annular seat 24 at the upper end of the bore 21, said retainer ring being fixed in place, during fabrication of the dispensing valve, by inwardly rolling over an upper marginal end portion 35 of the thermoplastic valve body member 11 from the cylindrical shape thereof as indicated by the dotted line representation thereof in FIG. 1 to the full-line representation thereof as indicated at 36.

FIG. 1 illustrates the dispensing valve 10 in shut-off condition, being achieved by turning the valve stem handle 26 inwardly along the internally threaded bore 19 until the frusto-conical surface 28 seats firmly upon the valve seat 16 of the valve body member 11, thereby preventing any flow of fluid to be dispensed from the inlet port defined by the bore 14 into the valve seat chamber 15 and thence through the axial bore 18 of the discharge port 17. Upon turning of the valve stem handle 26 in the opposite or opening direction so that the externally threaded portion 29 threads upwardly and outwardly of the internally-threaded bore 19, the frusto-conical surface 28 will be removed from the valve seat 16, allowing fluid under pressure to pass through the axial bore 18 of the discharge port 17, the volume of the flow being controlled by adjusting the distance by which said frusto-conical surface is moved from said valve seat. If for any reason the valve stem 25 is turned beyond its fully open position, as indicated in FIG. 2, the lower end of the externally-threaded portion 29 of the valve stem 25 will be completely withdrawn from the internally threaded bore 19 of the valve body member 11, thereby preventing any further forceful outward movement of said valve stem with respect to said body member. At this point, continued unscrewing of the valve stem 25 has no effect other than to turn freely in the valve body. In this connection it is to be noted that the axial length of the externally threaded valve stem portion 29 is such, as compared with the increased-diameter bores 20 and 21 in the valve body member 11, that when said valve stem is in its fully open or unscrewed position, the upper end of the increased-diameter, externally threaded portion 29 of said valve stem will have engaged the underside of the spring reatainer ring 30 and carried it upwardly to such an extent as to more or less fully compress the compression spring 31 as constrained against the underside of the O-ring seal 33 through the O-ring seating washer 32. Thus, while the valve stem 25 is in its fully withdrawn position as illustrated in FIG. 2, it will be resiliently urged in the inward direction by the compressed helical spring 31 so that, when it is desired to shut the valve off again by turning the valve handle in the opposite direction, the valve stem external threading will automatically by fed into inter-threaded engagement with the internally threaded bore 19 of the body member without the necessity of applying inward thrust while turning the valve handle 26 in the valve-closing direction.

Being very inexpensive because of its molded synthetic plastic construction, the valve 10 is particularly well-suited for use in association with disposable containers containing pressurized refrigerants used in charging air conditioning equipment or for containing "bottled" gas such as propane or butane for consumer use. For such use, the dispensing valve 10 will preferably be provided with a pressure relief port, indicated at 37, for relieving pressure in the associated container, if the gas pressure therein should become excessive, because of overheating for example. To this end, the valve body member 11 is integrally formed, opposite the discharge port 17, with a laterally outwardly extending, cylindrical, boss 38 having a first coaxial bore 39 the inner end of which opens into a comparatively lesser diameter coaxial bore 41 communicating with the entrance port bore 14 below the valve seat 16. The zone of juncture between the coaxial bores 39 and 41 is defined by an outwardly extending, peripheral projection 40 defining an annular pressure relieve valve seat 42. A substantially cylindrical valve discharge disc 43, which is also preferably molded of a suitable synthetic plastic material, is coaxially received within the bore 39 and provided at its inner end with a shallow, cylindrical recess 44 within which is received and retained, such as by friction fit therein, a comparatively resilient disc washer 45 as of synthetic rubber, which is normally seated against the valve seat 42. The valve discharge disc 43, which is slidably received within the pressure relief discharge bore 39, is peripherally fluted, as indicated at 46, to provide for the free outflow of gas under pressure upon actuation of the pressure relief mechanism, as is hereinbelow more particularly described.

Means is provided for resiliently urging the valve discharge disc 43 in sealing engagement against the valve seat 42, as illustrated in the drawings. To this end, a helical compression spring 47 is coaxially fitted within the bore 39, constrained at one end against the outside of the valve disc 43 and positioned thereat as by a conical locating projection 48 integrally formed with and extending coaxially outwardly of said valve discharge disc. The opposite outer end of the compression spring 47 is abuttingly constrained against an abutment member 49 comprising a star-shaped, dish-formed resilient metal clip member 50 secured within a central aperture 51 of which is a synthetic plastic plug member 52 formed at the inside with a rounded locating dome 53 adapted to circumjacently receive an outer end portion of said compression spring and, at the outside, with a cylindrical head portion 54. The clip member 50 of the abutment member 49 is of slightly greater size than that of the bore 39 within which it is received, so that when press-fitted therein from the outer end of the bore 39, it will become wedged in place at the position required to effect the desired pressure of the valve discharge disc 43 against the valve seat 42. In this assembly operation, the cylindrical head portion 54 of the abutment member 49 serves as an abutment surface for the application of a gauge tool used for pressfitting said abutment member at the required location. In operation, it will be understood that the pressure afforded against the valve discharge disc 43 by the compressed compression spring 47 holding it in seated position against the relief valve seat 42 will be such as to prevent the escape of pressurized fluid through the pressure relief valve bore 39 under normal operating conditions. Under predetermined excessive internal pressure, however, the discharge disc 43 will be forced outwardly of the valve seat 42 against the reactive yielding force of the compression spring 47 to permit the escape of the contents through the discharge port bore 39, and thereby reduce the pressure within the pressurized container or the like to a safe value.

A salient feature of the invention resides in the fact that if, in attempts to open the valve, the valve stem 12 by use of its handle is inadvertently turned beyond full open position, as described above it will become disengaged from the threaded bore 19 of the valve body member 11 and thereafter turn freely and harmlessly instead of being forced outwardly of the upper end of the valve housing, as might easily occur in ordinary plastic valve construction. It is for this reason that the valve body member can safely be fabricated of comparatively weak material, such as of a synthetic thermoplastic material instead of metal.

While I have illustrated and described herein only one form in which my invention can conveninetly be embodied in practice, it is to be understood that this form is given by way of example only and not in a limiting sense. For example, instead of using a compression spring 31 as the resilient member urging the valve stem assembly in the inward direction, one or two additional resilient O-rings in addition to the O-ring 33 could be employed. Alternatively, a resilient wave-washer or a wave-washer in combination with an additional O-ring could be also used in place of the compression spring 31. The invention, in brief, comprises all the embodiments and modifications of the invention coming within the scope and spirit of the following claims.

What I claim as new and desire to secure by Letters Patent is:

1. A dispensing valve comprising, in combination, a valve body member having a first bore defining an inlet port at one end of said body member and communicating, at its inner end, with a valve seat chamber, said chamber defining a circular valve seat at the juncture thereof with said inlet port bore, an internally threaded bore in said body member, outwardly of and in coaxial alignment with said circular valve seat, said internally threaded bore extending at its outer end, into a first increased-diameter bore coaxial with said internally threaded bore, a valve stem and handle assembly comprising a valve stem having a handle at one end, said valve stem comprising, along its length, a coaxial, externally threaded increased-diameter portion threadable in said internally threaded bore in said body member, the other end of said valve stem being formed with a circular surface, complemental with said circular valve seat and seatable thereagainst for sealing off the inner end of said inlet port bore at said valve seat chamber, said externally-threaded portion of said valve stem, when fully un-threaded with respect to said internally threaded bore of said body member, being received within said first increased-diameter bore, and abutment means at said outer end of said first increased-diameter bore co-operative with upper end portions of said increased-diameter externally threaded portion of said valve stem preventing further withdrawal of said valve stem and handle assembly with respect to said body member after said externally threaded increased-diameter portion of said valve stem has been fully received within said first increased-diameter bore of said body member.

2. A dispensing valve as defined in claim 1, wherein said valve body member and said valve stem and handle assembly are fabricated of a synthetic plastic material.

3. A dispensing valve as defined in claim 2, wherein said abutment means comprises a resilient O-ring.

4. A dispensing valve as defined in claim 1, wherein said abutment means at said outer end of said first increased-diameter bore of said body member is resilient in the axial direction of said valve stem so that said valve stem, when fully unthreaded with respect to said internally threaded bore of said body member, will he yieldingly constrained in abutment with a marginal outer end portion of said internally threaded bore.

5. A dispensing valve as defined in claim 4, wherein said valve body member further comprises a second increased-diameter bore, coaxial with and extending outwardly of said first increaseddiameter bore, said valve body being fabricated of a synthetic plastic material, said abutment means further comprising an inwardly rolled-over upper marginal end portion at the outer end of said second increated-diameter bore.

6. A dispensing valve as defined in claim 5, wherein said abutment means comprises a helical compression spring.

7. A dispensing valve as defined in claim 6, including abutment means seated on the annular peripheral shoulder defined by the juncture of said first and second increased-diameter bores for abuttingly seating the inner end of said helical compression spring.

8. A dispensing valve as defined in claim 7, wherein the axial length of said externally threaded, increased-diameter portion of said valve stem is greater than the axial length of said first increased-diameter bore of said body member.

9. A dispensing valve as defined in claim 8, including a pressure relief bore in said body member and means communicating with said inlet port bore for releasing pressure within said inlet port bore at a predetermined pressure value.

10. A dispensing valve as defined in claim 1, wherein said abutment means comprises a helical compression spring circumjacent said valve stem.

* * * * *